(12) United States Patent
Papaefstathiou et al.

(10) Patent No.: US 8,276,145 B2
(45) Date of Patent: Sep. 25, 2012

(54) PROTECTED MODE SCHEDULING OF OPERATIONS

(75) Inventors: Efstathios Papaefstathiou, Redmond, WA (US); Jinsong Yu, Sammamish, WA (US); Stanislav A. Oks, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 12/163,726

(22) Filed: Jun. 27, 2008

(65) Prior Publication Data

US 2009/0328058 A1 Dec. 31, 2009

(51) Int. Cl.
*G06F 9/46* (2006.01)

(52) U.S. Cl. .................................................. 718/102

(58) Field of Classification Search .................. None
See application file for complete search history.

(56) References Cited

U.S. PATENT DOCUMENTS

| | | | |
|---|---|---|---|
| 6,076,174 A | 6/2000 | Freund | |
| 6,195,676 B1 | 2/2001 | Spix et al. | |
| 6,668,269 B1 | 12/2003 | Kamada et al. | |
| 6,981,258 B1 | 12/2005 | Takakura | |
| 7,065,762 B1 | 6/2006 | Duda et al. | |
| 7,089,557 B2 * | 8/2006 | Lee | 718/102 |
| 7,222,218 B2 | 5/2007 | Dutt et al. | |
| 7,225,446 B2 * | 5/2007 | Whitton | 718/108 |
| 7,346,902 B2 | 3/2008 | Dutt et al. | |
| 2002/0046230 A1 * | 4/2002 | Dieterich et al. | 709/107 |
| 2002/0073129 A1 | 6/2002 | Wang et al. | |
| 2004/0186876 A1 * | 9/2004 | Brandstatter | 709/200 |
| 2004/0244003 A1 | 12/2004 | Perfetto et al. | |
| 2007/0124732 A1 | 5/2007 | Lia et al. | |

OTHER PUBLICATIONS

Bershad, Brian N., et al., "Spin—An Extensible Microkernel for Application-specific Operating System Services", Sep. 1994, 4 pages.
Engler, Dawson R., et al., "Exokernel: an oprating system architecture for application-level resource management", Mar. 1995, 17 pages.
Kaelin, Mark, et al., "Database Optimization: The Logic of the User Mode Scheduler in SQL Server", Feb. 2004, 5 pages.
Ford, Bryan, et al., "CPU Inheritance Scheduling", Proceedings of the USENIX 2nd Symposium on Operating Systems Design and Implementation, Oct. 1996, 16 pages.

* cited by examiner

*Primary Examiner* — Emerson Puente
*Assistant Examiner* — Gregory Kessler
(74) *Attorney, Agent, or Firm* — Workman Nydegger (57) ABSTRACT

The present invention extends to methods, systems, and computer program products for protected mode scheduling of operations. Protected mode (e.g., user mode) scheduling can facilitate the development of programming frameworks that better reflect the requirements of the workloads through the use of workload-specific execution abstractions. In addition, the ability to define scheduling policies tuned to the characteristics of the hardware resources available and the workload requirements has the potential of better system scaling characteristics. Further, protected mode scheduling decentralizes the scheduling responsibility by moving significant portions of scheduling functionality from supervisor mode (e.g., kernel mode) to an application.

18 Claims, 9 Drawing Sheets

PROTECTED MODE SCHEDULING OF OPERATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, database management, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

Typically, when a computer system is turned on or otherwise "booted up", a basic input/output system ("BIOS") is executed from read-only memory (e.g., a flash memory chip). The BIOS performs a sequence of activities to prepare the computer system for operation. The sequence of activities can include (depending on whether it is a cold boot or a reboot) checking CMOS setup for custom settings, loading interrupt handlers and device drivers, initializing registers and power management, testing various hardware components of the computer system to insure they are working properly (a power on self test or "POST"), and activating BIOS chips on other cards (e.g., SCSI and graphics cards). From the CMOS settings, the BIOS can identify bootable devices and initiate a bootstrap sequence to launch an operating system.

During computer system operation, the BIOS also provides a set of low-level routines that the operating system can use to interface with different hardware devices, such as, for example, keyboard, mouse, video display, ports, etc. Thus, to perform a typical computing task, an operating system receives commands (either from an application program or a user) and forwards those commands to appropriate physical resources. The physical resources in turn implement lower level operations to perform the computing task.

Operating systems typically include two distinct operating modes: a supervisor mode (sometimes referred to as "kernel mode) and a protected mode (sometimes referred to as "user mode"). When operating in supervisor mode a process has unrestricted access to all resources, can execute any instructions, and can reference any memory location. On the other hand, when operating in protected mode, resource access is restricted, the execution of some instructions is prohibited, and reference to some memory locations is prohibited. Operating systems typically have a central component or "kernel" that is trusted to operate in kernel mode. Other portions of the operating system as well as other programs are not trusted and are not given direct access to privileged resources and instructions. Thus, software operating in protected mode must request use of the kernel (e.g., through a system call) to perform privileged operations.

Generally, the operating system manages hardware and software resources so that the computer system it lives in behaves in a flexible but predictable way. In a typically computer system these resources can include a processor, memory, disk space, etc. The operating system also provides a consistent application for invoking other software, such as, for example, application programs. Typically, when an application program executes, in creates one or more processes for performing various computing tasks. Further, most operating systems permit multiple independent applications to run one a computer system at the same time. Thus, at any given time a computer system can have multiple processes corresponding to multiple different applications running at the same time.

Process creation is a privileged operation that requires an application program to call the kernel to implement. The kernel can allocate memory for a process, load program code form disk, and start running the process.

Each of the multiple created processes may require one or more of processor (CPU), input/output, memory, and storage resources to perform designated computing tasks. However, some resources can perform tasks only for a small limited number of, and often only one, process(es) at a time. For example, many CPUs are limited to executing instructions for one process at a time. Thus, many operating systems use multitasking to give the appearance of performing multiple computing tasks at the same time. Multitasking is mechanism by which multiple processes share common processing resources, such as, for example, a CPU.

In some operating systems a process can include many sub-processes sometimes referred to as threads of execution (or just as "threads") or fibers. A thread or fiber is a sub-process that is a separate, independent sequence of execution within the code of one process. Threads and fibers provide a mechanism for a process to fork (or split) itself into two or more simultaneously (or pseudo-simultaneously) running tasks. Threads and fibers and processes differ among operating systems. However, generally, a thread or fiber is contained inside a process and different threads or fibers in the same process share some resources while different processes do not share resources. Although threads and fibers can independently request access to privileged resources if the do not already have access. Threads and fibers typically differ in that threads use pre-emptive multitasking while fibers use cooperative multitasking.

Typically, to implement a desired type multitasking, an operating system kernel includes piece of software called a scheduler which determines how much time each process and/or thread (and to a lesser extent fibers in those environments) can spend executing and in which order execution control is to be passed. Control is passed to a process and/or thread by the kernel, which permits process/thread access to the CPU and memory. At a later time, control is returned to the kernel through some mechanism to those other processes and/or threads can access the CPU and memory. There is a wide variety of scheduling algorithms, such as, for example, Borrowed-Virtual-Time ("BVT") scheduling, multilevel feedback queue scheduling, interval scheduling, completely fair scheduling, etc. that can be implemented in a operating system kernel to multiplex CPU resources to multiple processes/threads/fibers.

Passing control between the kernel and process/thread/ fiber and vice versa is sometimes referred to as context switching. Context switching includes storing and restoring state (context) of a CPU such that multiple processes can share a single CPU resource. Context switches are typically computationally expensive. For example, during a context switch a running process is stopped and another process is given a chance to run. The operating system kernel has to stop execution of the running process, copy out values in hardware registers to its process control block ("PCB") update the hardware registers with the values from the PCB of the new process. A PCB can include a variety of different information depending on the operating system. However, generally a PCB includes a process identifier (PID), register values including a program counter for the process, the address space of the process, a priority, process accounting information (e.g., when the process was last run, how much CPU time it has accumulated, etc, and a pointer to the PCB of the next process to run. All this information must be unloaded for a current process and loaded for a new process on each context switch.

Accordingly, in most operating systems the kernel essentially acts as a centralized repository and authority for threads running a system wide policy. That is, the kernel performs all scheduling and context maintenance. As such, the kernel acts as bottleneck potentially limiting scalability. Performance is also potentially degraded when a large number of threads are active due at least in part to substantial loading and unloading of context data.

Further, an operating system kernel defines both the execution abstraction (e.g., threads, fibers, etc.) and the scheduling algorithm that the kernel is to use. Thus, all applications running the operating system are essentially forced to use the defined execution abstraction and scheduling algorithm. This is less than optimal, since some applications may be better suited for use with other execution abstractions and/or scheduling algorithms. For example, an application may be well suited for using ToDos (a type of execution abstraction) and multilevel feedback queue scheduling. However, if the kernel defines threads with BVT scheduling, the application is nonetheless forced to use that combination.

Since many applications have different requirements it is also essentially impossible to derive a single (or one size fits all) scheduling algorithm that is optimal for all applications. For example, a word processor, a media player, and a disk backup application may each have different optimal scheduling algorithms. However, trade offs may be made to define a scheduling algorithm that is at least functional, albeit non-optimally, across a range of applications.

BRIEF SUMMARY

The present invention extends to methods, systems, and computer program products for protected mode scheduling of operations. In some embodiments, a computer system configures the scheduling of processor resources to occur in protected (e.g., user) mode to decentralize scheduling responsibility from supervisor (e.g., kernel) mode. The computer system creates a protected mode scheduling domain operating in the protected mode of an operating system. Creating a protected mode scheduling domain includes creating a virtual processor. The virtual processor maps at least a portion of the physical processor for use by execution objects of the protected mode scheduling domain.

The virtual processor includes a protected mode virtual processor. The protected mode virtual processor is configured to process supervisor mode notifications and dispatch execution objects. The virtual processor also includes a supervisor mode virtual processor. The supervisor mode virtual processor is configured to reserve at least a portion of the physical processor for use by execution objects of the protected mode scheduling domain.

Creating a protected mode scheduling domain also includes loading at least one protected mode scheduling policy that differs from the default supervisor mode scheduling policy. The at least one protected mode scheduling policy is for multiplexing execution objects of the protected mode scheduling domain on the virtual processor. Creating a protected mode scheduling domain also includes creating an execution object store configured to store state for execution objects of the protected mode scheduling domain. The execution object store facilitates switching context between different execution objects within the protected mode scheduling domain.

In other embodiments, a computer system schedules the consumption of processor resources in protected mode to decentralize scheduling responsibility from supervisor mode. The computer system allocates physical processor resources to a first execution object of a protected mode scheduling domain within the protected mode scheduling domain. The physical processor resources are allocated in accordance with a protected mode scheduling policy that differs from the default supervisor mode scheduling policy. The computer system utilizes the allocated physical processor resources to partial complete work indicated in the first execution object.

The computer system determines, in accordance with the protected mode scheduling policy, that allocation of physical processor resources is to transition to a second execution object within the protected mode scheduling domain prior to fully completing the work indicated in the first execution object. The computer system switches context from the first execution object to the second execution object within protected mode and without transitioning to supervisor mode.

Switching context includes persisting the state of first execution object in an execution object store resident within the protected mode scheduling domain. Switching context also includes loading the state of the second execution object from the execution object store. The computer system allocates physical processor resources to the second execution object of the protected mode scheduling domain within the protected mode scheduling domain subsequent to switching context to the second execution object. The computer system utilizes the allocated physical processor resources to partial complete work indicated in the second execution object.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for protected mode scheduling of operations. In some embodiments, a computer system configures the scheduling of processor resources to occur in protected (e.g., user) mode to decentralize scheduling responsibility from supervisor (e.g., kernel) mode. The computer system creates a protected mode scheduling domain operating in the protected mode of an operating system. Creating a protected mode scheduling domain includes creating a virtual processor. The virtual processor maps at least a portion of the physical processor for use by execution objects of the protected mode scheduling domain.

The virtual processor includes a protected mode virtual processor. The protected mode virtual processor is configured to process supervisor mode notifications and dispatch execution objects. The virtual processor also includes a supervisor mode virtual processor. The supervisor mode virtual processor is configured reserve at least a portion of the physical processor for use by execution objects of the protected mode scheduling domain.

Creating a protected mode scheduling domain also includes loading at least one protected mode scheduling policy that differs from the default supervisor mode scheduling policy. The at least one protected mode scheduling policy is for multiplexing execution objects of the protected mode scheduling domain on the virtual processor. Creating a protected mode scheduling domain also includes creating an execution object store configured to store state for execution objects of the protected mode scheduling domain. The execution object store facilitates switching context between different execution objects within the protected mode scheduling domain.

In other embodiments, a computer system schedules the consumption of processor resources in protected mode to decentralize scheduling responsibility from supervisor mode. The computer system allocates physical processor resources to a first execution object of a protected mode scheduling domain within the protected mode scheduling domain. The physical processor resources are allocated in accordance with a protected mode scheduling policy that differs from the default supervisor mode scheduling policy. The computer system utilizes the allocated physical processor resources to partial complete work indicated in the first execution object.

The computer system determines, in accordance with the protected mode scheduling policy, that allocation of physical processor resources is to transition to a second execution object within the protected mode scheduling domain prior to fully completing the work indicated in the first execution object. The computer system switches context from the first execution object to the second execution object within protected mode and without transitioning to supervisor mode.

Switching context includes persisting the state of first execution object in an execution object store resident within the protected mode scheduling domain. Switching context also includes loading the state of the second execution object from the execution object store. The computer system allocates physical processor resources to the second execution object of the protected mode scheduling domain within the protected mode scheduling domain subsequent to switching context to the second execution object. The computer system utilizes the allocated physical processor resources to partial complete work indicated in the second execution object.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general-purpose or special-purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Within this description and the following claims, an "execution object" is defined as an instance of a workload abstraction that consumes resources and is time shared (multiplexed) on a processor. Examples of execution objects include: threads, chores, fibers, promises, Todos, etc.

Within this description and the following claims, "scheduler", "scheduling algorithm", and "scheduling policy algorithm" are defined as a set of components for multiplexing execution objects on a processor. Schedulers, scheduling algorithms, and scheduling policy algorithms can implement a variety of different types of scheduling, including: Borrowed-Virtual-Time ("BVT") scheduling, completely fair scheduling ("CFS"), different types of Round Robin scheduling, queue based scheduling (FIFO, multilevel, etc.), stack based scheduling (LIFO), gang scheduling, interval scheduling, Turn Dispatching, etc.

Figure 1A:
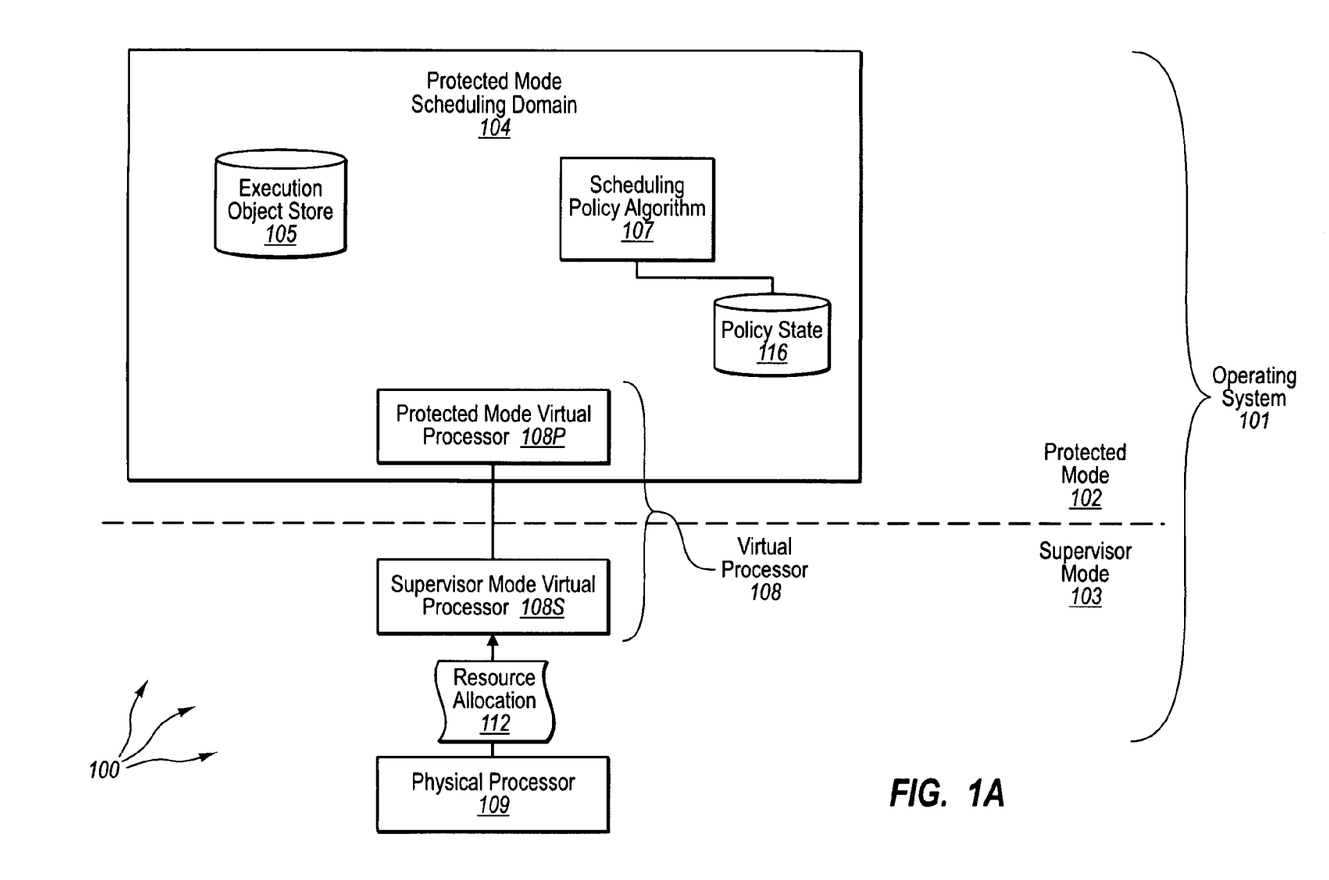
FIG. 1A illustrates a portion of a example computer architecture that facilitates configuring the scheduling of processor resources to occur in protected mode to decentralize scheduling responsibility from supervisor mode.

FIG. 1A illustrates a portion of computer architecture 100 that facilitates configuring the scheduling of processor resources to occur in protected mode so as to decentralize scheduling responsibility from supervisor mode. As depicted, computer architecture 100 includes processor 109 (and possibly one or more additional processors) and operating system 101. Operating system 101 can execute applications in protected mode 102 (e.g., user mode) and supervisor mode 103 (e.g., kernel mode). Protected mode 102 can limit program access to the resources of physical processor 109. On the other hand, supervisor mode 103 has unlimited access to resources of physical processor 109. One or more functions gate access to supervisor mode 103 to permit a program in protected mode 102 to transition to supervisor mode 103 to resources of physical processor 109.

Thus, programs executed within operating system 101 can transition from protected mode 102 to supervisor mode 103 and from supervisor mode 103 to protected mode 102 depending on program instructions. Supervisor mode 103 has a default supervisor mode execution object format (e.g., threads) that consumes resources of physical processor 109 on a time shared basis in accordance with a default supervisor mode scheduling policy (e.g., "BVT" scheduling).

Figure 4:
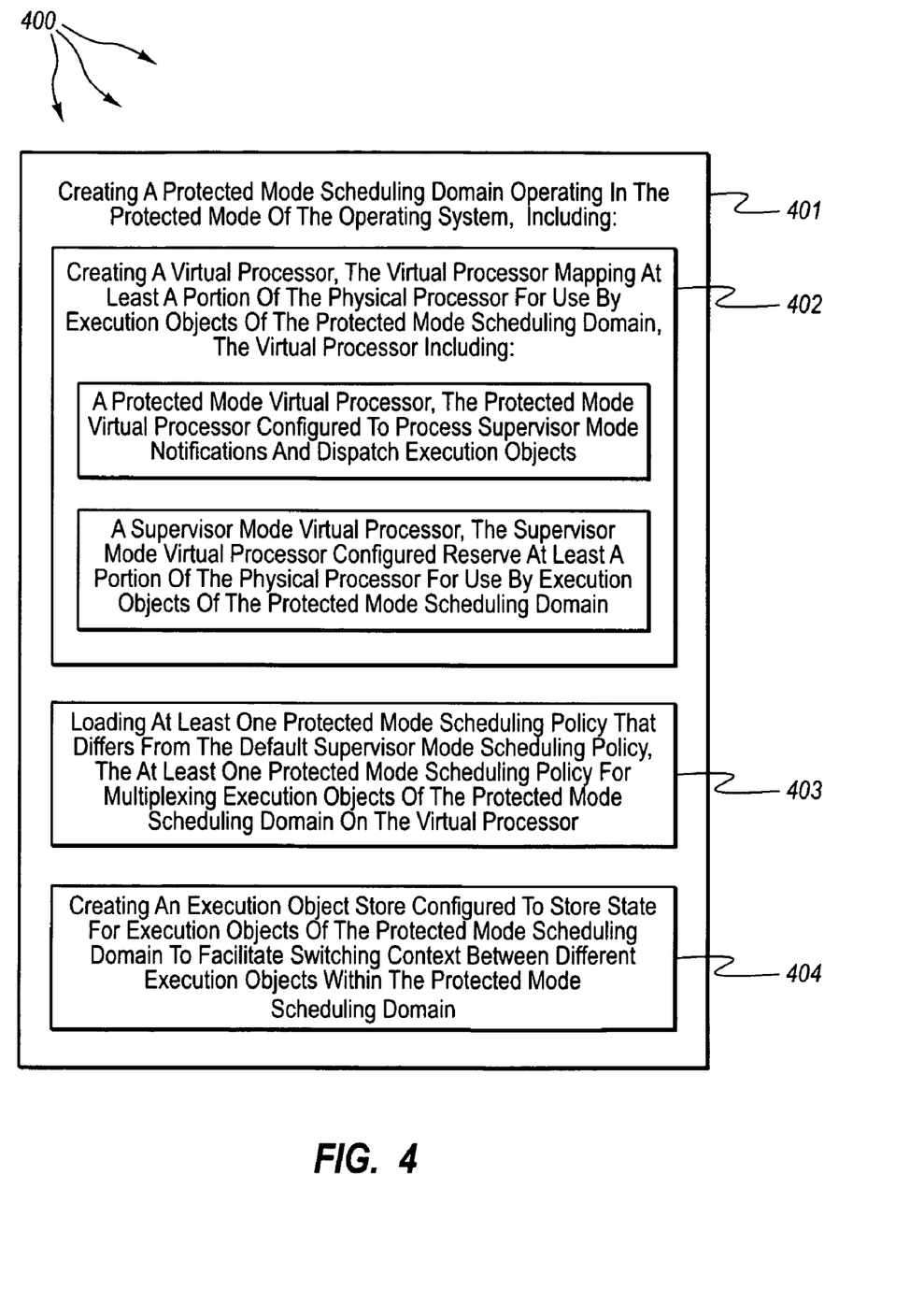
FIG. 4 illustrates a flow chart of an example method for configuring the scheduling of processor resources to occur in protected mode.

FIG. 4 illustrates a flow chart of an example method 400 for configuring the scheduling of processor resources to occur in protected mode. Method 400 will be described with respect to the components and data depicted in FIG. 1A.

Method 400 includes an act of creating a protected mode scheduling domain operating in the protected mode of the operating system (act 401). For example, operating system 101 can create protected mode scheduling domain 104 within protected mode 102.

Creating a protected mode scheduling domain includes an act of creating a virtual processor, the virtual processor mapping at least a portion of the physical processor for use by execution objects of the protected mode scheduling domain (act 402). For example, operating system 101 can create virtual processor 108. Generally, virtual processor 108 abstracts the default execution object format and scheduler of supervisor mode 103 from protected mode scheduling domain 104. For example, virtual processor 108 maps resource allocation 112 (a portion of physical processor 109's resources) for use by execution objects within protection mode scheduling domain 104.

Virtual processor 108 includes protected mode virtual processor 108P. Protected mode virtual processor 108 is configured to process supervisor mode notifications from supervisor mode 103 and dispatch execution objects within protected mode scheduling domain 104. Virtual processor 108 also includes supervisor mode virtual processor 108S. Supervisor mode virtual processor 108S is configured to reserve at least a portion of physical processor 109 (e.g., resource allocation 112) for use by execution objects of protected mode scheduling domain 104.

Creating a protected mode scheduling domain also includes loading at least one protected mode scheduling policy that differs from the default supervisor mode scheduling policy, the at least one protected mode scheduling policy for multiplexing execution objects of the protected mode scheduling domain on the virtual processor (act 403). For example, operating system 101 can load scheduling policy algorithm 107 for multiplexing execution objects within protected mode scheduling domain 104. Scheduling policy algorithm 107 can be virtually any scheduling policy, such as, for example, scheduling, multilevel feedback queue scheduling, interval scheduling, completely fair scheduling, etc., that differs from the default scheduling policy of supervisor mode 103. Policy state 116 can data structures for persisting policy state for scheduling policy algorithm 107.

Creating a protected mode scheduling domain also includes creating an execution object store configured to store state for execution objects of the protected mode scheduling domain to facilitate switching context between different execution objects within the protected mode scheduling domain (act 404). For example, operating system 101 can create execution object store 105 to store state for execution objects of protected mode scheduling domain 104 to facilitate switching between objects within protected mode scheduling domain 104. Execution objects of protected mode scheduling domain 104 (e.g., ToDos) can differ from the execution objects used in supervisor mode 103 (threads).

Figure 1B:
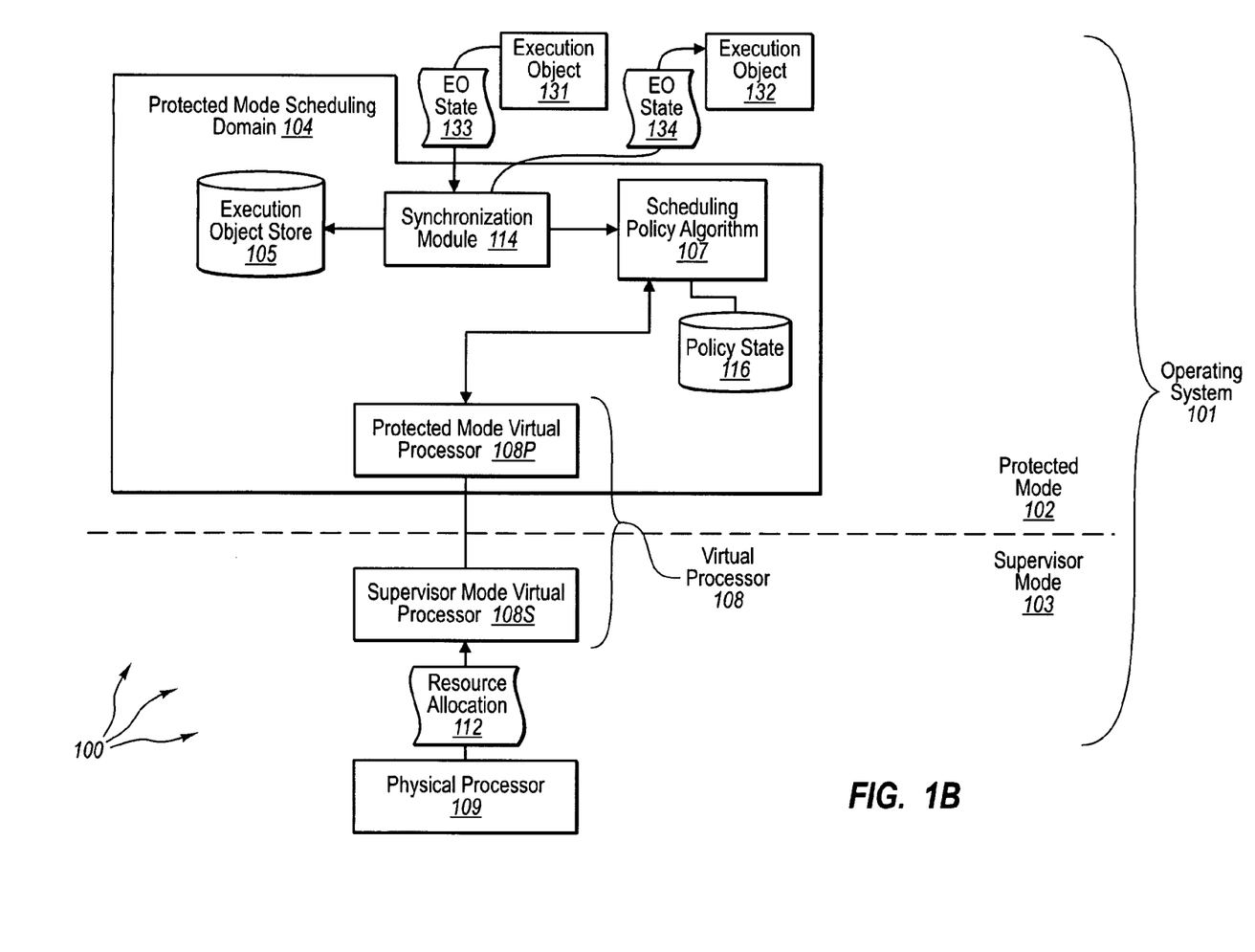
FIG. 1B illustrates a portion of the example computer architecture that schedules the consumption of processor resources in protected mode to decentralize scheduling responsibility from supervisor mode.

Subsequent to configuring protected mode scheduling domain 104, the resources of physical processor 109 (e.g., resource allocation 112) can be multiplexed between different execution objects within protected mode scheduling domain 104. FIG. 1B illustrates a portion of the example computer architecture 100 that schedules the consumption of processor resources in protected mode to decentralize scheduling responsibility from supervisor mode.

As depicted in FIG. 1B, protected mode scheduling domain 104 further includes synchronization module 114. Generally, the components of protected mode scheduling domain 104 permit scheduling operations, such as, for example, blocking/unblocking due to synchronization, yielding, or termination, and context switching to take place within process. Synchronization module 114 can be configured for use with a specified type of execution object. An intrinsic relationship between synchronization module 114 and scheduling policy algorithm 107 can exist, since synchronization operations can yield execution object state transitions that affect policy state 116. Synchronization module 114 can be generated/loaded during or after creation of protection mode scheduling domain 104, depending at least in part on the type of execution object that is to be used.

Figure 5:
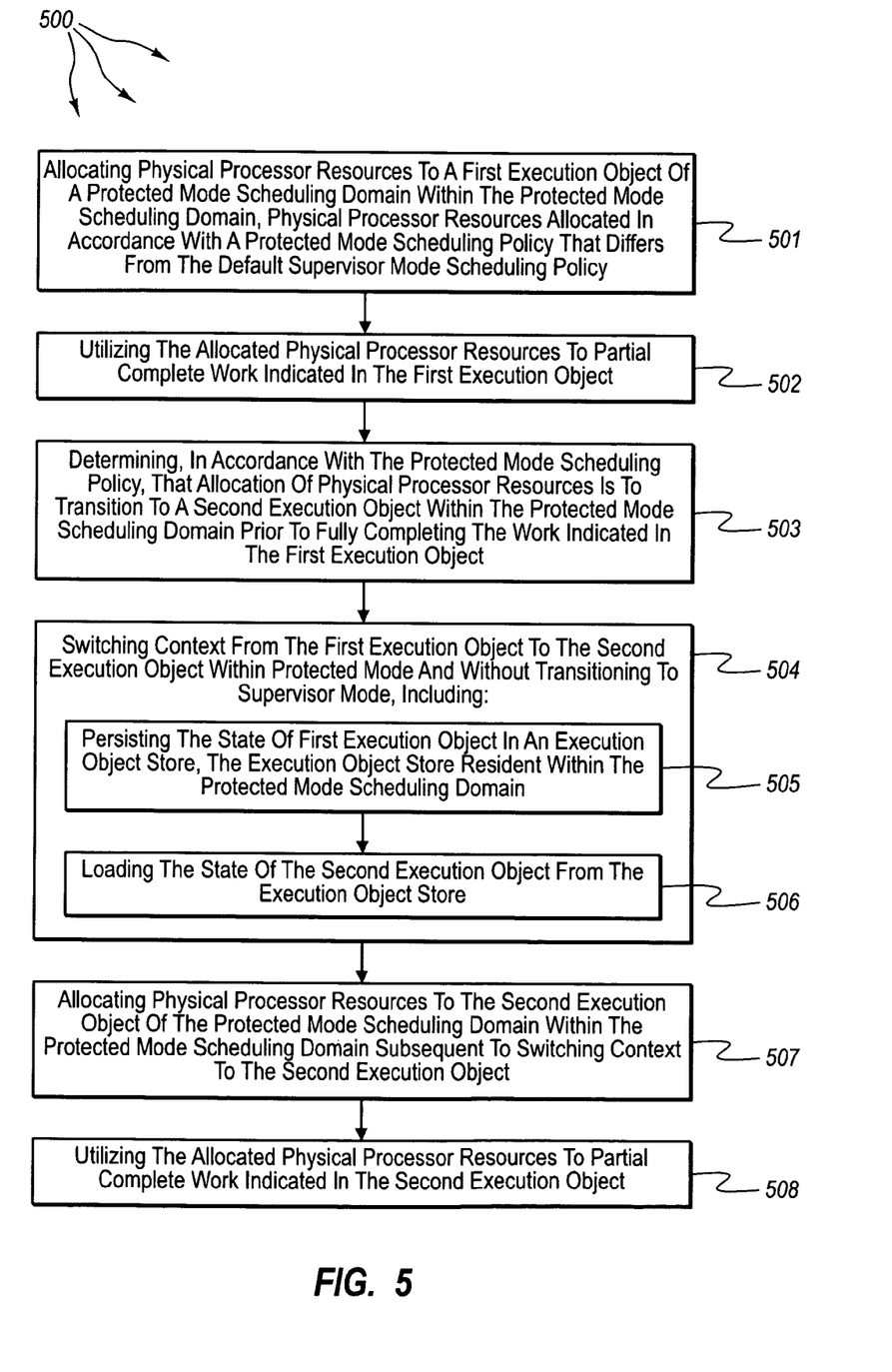
FIG. 5 illustrates a flow chart of an example method for scheduling processor resources in protected mode.

FIG. 5 illustrates a flow chart of an example method 500 for scheduling processor resources in protected mode. Method 500 will be described with respect to the components and data depicted in FIG. 1B.

Method 500 includes an act of allocating physical processor resources to a first execution object of a protected mode scheduling domain within the protected mode scheduling domain, physical processor resources allocated in accordance with a protected mode scheduling policy that differs from the default supervisor mode scheduling policy (act 501). For example, operating system 101 can allocate resource allocation 112 to execution object 131 in accordance with scheduling policy algorithm 107. Method 500 includes an act of utilizing the allocated physical processor resources to partial complete work indicated in the first execution object (act 502). For example, execution object 131 can utilize resource allocation 112 to partial complete work indicated in execution object 131.

Method 500 includes an act of determining, in accordance with the protected mode scheduling policy, that allocation of physical processor resources is to transition to a second execution object within the protected mode scheduling domain prior to fully completing the work indicated in the first execution object (act 503). For example, operating system 101 can determine, in accordance with scheduling policy algorithm 107, that resource allocation 112 is to transition of execution object 132, prior to completing the work indicated in execution object 131.

Method 500 includes an act of switching context from the first execution object to the second execution object within protected mode and without transitioning to supervisor mode (act 504). For example, operating system 101 can switch context from execution object 131 to execution object 132 within protected mode scheduling domain 104 and without switching to supervisor mode 103.

Switching context includes an act of persisting the state of first execution object in an execution object store, the execution object store resident within the protected mode scheduling domain (act 505). For example, at the time of the context switch, execution object 131 may have EO state 133. Synchronization module 114 can persist EO state 133 in execution object store 105. Switching context also includes an act of loading the state of the second execution object from the execution object store (act 506). For example, synchronization module 114 can load EO state 134 from execution object store 105. EO state 134 may have been previously persisted when context was switched away from execution object 132.

Method 500 includes an act of allocating physical processor resources to the second execution object of a protected mode scheduling domain within the protected mode scheduling domain subsequent to switching context to the second execution object (act 507). For example, operating system 101 can allocate resource allocation 112 to execution object 132 within protected mode scheduling domain 104 subsequent to switching context to execution object 132. Method 500 includes an act of utilizing the allocated physical processor resources to partial complete work indicated in the second execution object (act 508). For example, resource allocation 112 can be utilized to partially complete work indicated in execution object 132.

Generally, protected mode (e.g., user mode) scheduling decentralizes scheduling operations from supervisor mode (e.g., kernel mode). This decentralization essentially results in two levels of scheduling infrastructure that relieves a significant portion of the scheduling burden from supervisor mode. Basic operations that are privileged or involve system-wide resources, such as, for example, multiplexing a physical processor to reservations and processing timer interrupts are provided in supervisor mode (utilizing execution object format/scheduler of supervisor mode). For example, supervisor mode virtual processors can reserve physical processor resources in supervisor mode. Protected mode scheduling domains run in protected mode and multiplex execution objects on virtual processors. Accordingly, a significant amount of scheduling operations that would otherwise be performed in supervisor mode are instead performed in protected mode.

Further, work for an application can be performed using execution objects differing from the default execution object format supervisor mode 103 and/or using a scheduler differing from the default scheduler of supervisor mode 130. For example, a protected mode scheduling domain can be configured with a scheduler and execution object format that are better suited for the work of a specified application Embodiments of the invention also include using the execution object format of supervisor mode and/or scheduling algorithm of supervisor mode within a protected scheduling domain. For example, execution object 131 and 132 can be of the execution object format (e.g., threads) used in supervisor mode 103 and scheduling policy algorithm 107 can be that used in supervisor mode 103 (e.g., BVT). Even in this environment, decentralized scheduling still alleviates a portion of the scheduling burden from supervisor mode 103.

Figure 1C:
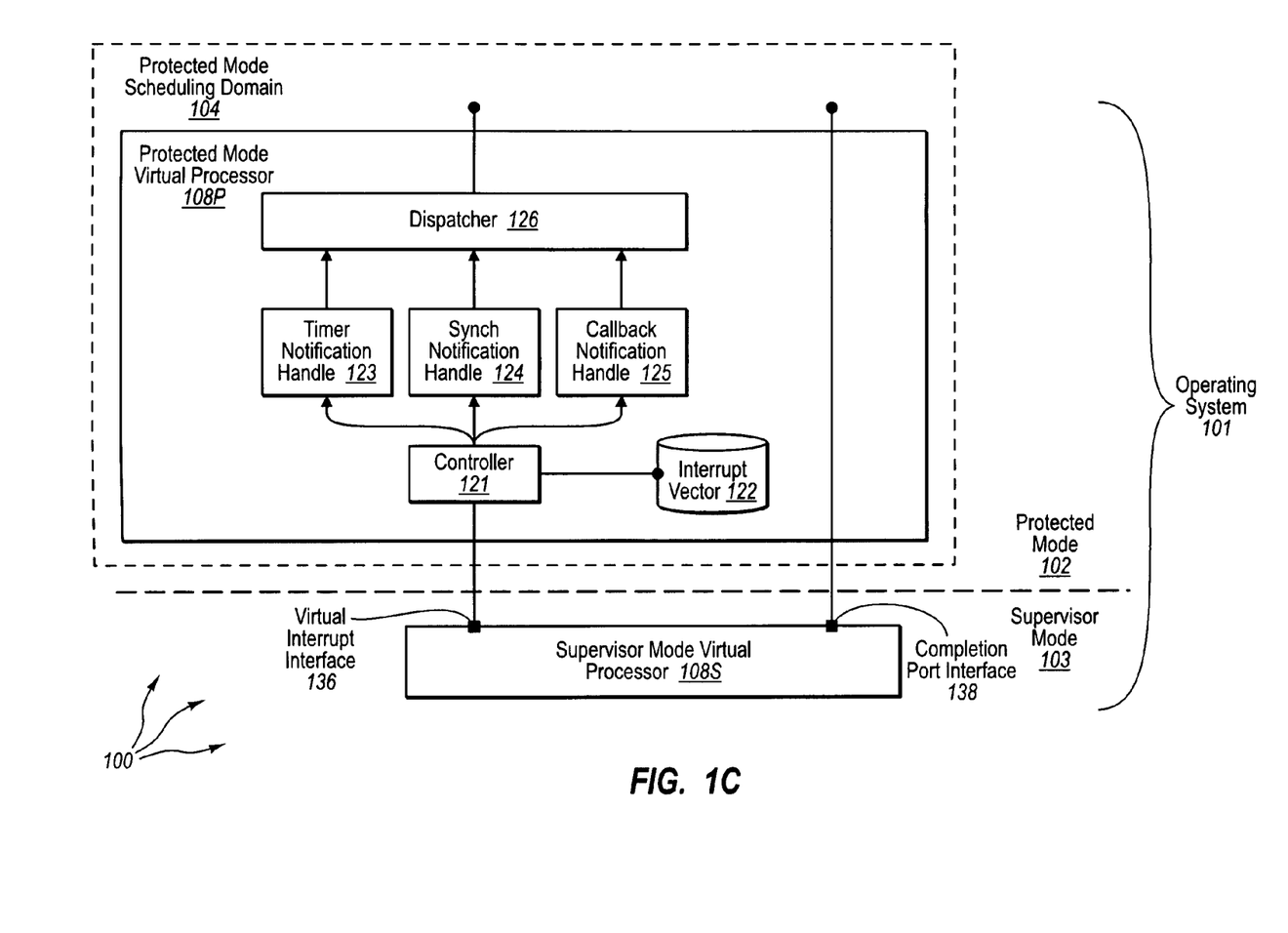
FIG. 1C illustrates a portion of the example computer architecture depicting further components of a virtual processor.

FIG. 1C illustrates a portion of the example computer architecture 100 depicting further components of a virtual processor. Protected mode virtual processor 108P essentially simulates the behavior of physical processor 109. Protected mode virtual processor 108 can use two notification models, interrupt and completion port paradigms, for asynchronous events. Context switching takes places in dispatcher 126 without involving any calls to supervisor mode 103. Dispatcher 126 can switch content to execution objects, for example, on top of a runable queue.

Generally, notification handles are responsible for processing notification requests generated by operating system 101, such as, for examples, timers and synchronization outside of protected mode scheduling domain 104. Protected mode scheduling domain 104 can set timers for either preemption or workload. Supervisor mode 103 can raise a virtual interrupt when the timer expires. Timer notification handler 123 processes virtual interrupts resulting from expired timers. Synchronization events outside of protected mode scheduling domain 104 can also raise virtual interrupts. Synch notification handle 124 can processes virtual interrupts resulting from synchronization events.

Non-blocking Application Binary Interface ("ABI") calls can cause a virtual processor 108 to halt waiting for the operation to complete. Thus, these types of calls can be issued in supervisor mode 103, raising an interrupt on completion. Callback notification handle 125 can process virtual interrupts resulting from non-blocking ABI calls.

Interrupt vectors 122 store memory addresses or indexes into an interrupt vector table (contain memory addresses) for timer notification handle 123, synch notification handle 124, and callback notification handler 125. Thus, when a virtual interrupt is received, controller 121 can refer to interrupt vectors 122 to execute the appropriate handler in response the virtual interrupt. Supervisor mode virtual processor 108S can communication interrupts to protected mode virtual processor 108P through virtual interrupt interface 136.

Completion data can be communicated from supervisor mode virtual processor 108S to protected mode scheduling domain 104 through completion port interface 138. When using the completion port paradigm, a notification handle notifies dispatcher 126 with a virtual interrupt. In response, execution of the current execution object is halted and control is passed to the scheduling policy algorithm 107. When an asynchronous event is configured to be delivered to completion port interface 138, upon completion of the event the supervisor mode virtual processor 108S can enqueue the event in its notification queue.

Scheduling policy algorithm 107 can process the outstanding completed events in the queue when the next opportunity arises. Preemption may not take place and the execution of the running execution object continues without interruption from completed event. During initialization of a process, the scheduling policy algorithm 107 configures the notification mechanism that will be utilized in the different types of events.

Thus supervisor mode virtual processor 108S can call the K-VP is to controller 121 or enqueue events in the completion port when asynchronous events complete. Controller 121 effectively runs in the stack of the current execution object. Scheduling policy algorithm 107 can then manage the stack and the context switch after the notification is initiated. Scheduling policy algorithm 107 can disable/enable virtual interrupts while processing notifications or executing execution object state-changing code. A similar model to double and triple fault can be implemented to deal with exceptions.

Generally, reservation physical processor scheduling process at least two ways for allocating virtual processors. A process can reserve physical processor resources (e.g., of physical processor 109) and attach a protected mode scheduler stub that implements the supervisor mode virtual processor (e.g., 108S). The protected mode scheduler stub creates a kernel based execution object (e.g., a thread) and exposes it to the process as a virtual processor (e.g., 108). In addition, the protected mode scheduler stub generates virtual interrupts to notify the protected mode virtual processor controller (e.g., 121). The virtual processor consumes all of the resources assigned to the reservation. Thus, using a reservation usage pattern, a single virtual processor is exposed by supervisor mode.

In some embodiments, an express reservation is not utilized and a virtual processor is instead requested from a default reservation. In these embodiments, the supervisor mode execution object (e.g., a kernel thread) representing the supervisor mode default scheduler is assigned resources based on the policy. For example, if a round-robin algorithm is applied the supervisor mode virtual processor can share equally in the default reservation with all the other supervisor mode execution objects and supervisor mode virtual processors that operate in the default reservation. Supervisor mode scheduler policies can be extended to incorporate protected mode scheduler stub functionality, such as, for example, exposing virtual processors to processes and generating virtual interrupts.

A protected mode scheduling domain can encapsulate multiple virtual processors. In accordance with the requirements of the application, virtual processors can be allocated in different physical processors or the same processor. Different virtual processors can also be allocated with different reservation operations. In some embodiments, multiple virtual processors are allocated using a gang reservation. The reservation in addition to the resource requirements specifies a concurrency factor. Supervisor mode reserves resources to multiple physical processors and allocates them so the virtual processors run simultaneously in all processes. However, it is also possible to allocate a mix of virtual processors from the default reservation and express reservations.

Figure 1D:
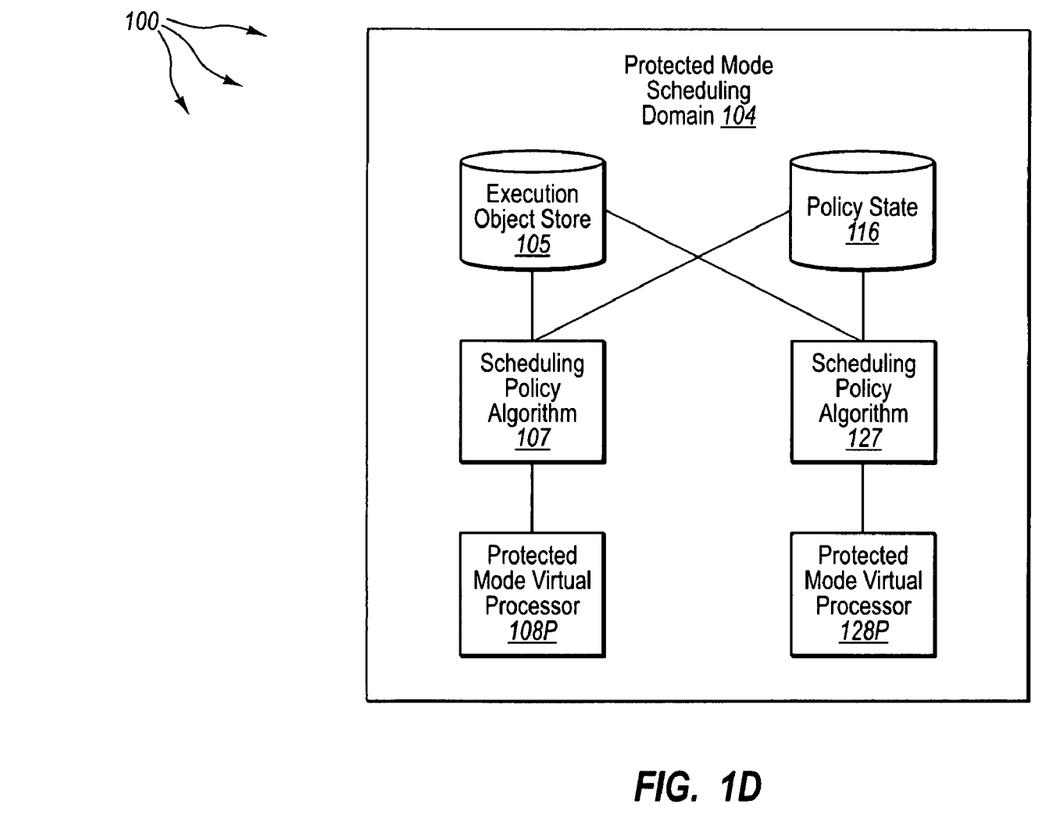
FIG. 1D illustrates a portion of the example computer architecture depicting multiple virtual processors in a protected mode scheduling domain.

FIG. 1D illustrates a portion of the example computer architecture 100 depicting multiple virtual processors in a protected mode scheduling domain. As depicted, protected mode scheduling domain 104 includes protected mode virtual processors 108P and 128P. Protected mode virtual processors 108P and 128P utilize corresponding scheduling policy algorithms 107 and 127 respectively. Each of scheduling policy algorithms 107 and 127 persist execution object state in execution object store 105 and their own corresponding policy state in policy state 116.

Semantics of protected mode scheduling domain 104 can be used to organize execution object store 105 and policy store 116 and share information between the scheduling policy algorithms 107 and 127. If for example a policy supports dynamic load balancing between the virtual processors, a common store can be used. However if a policy supports affinitization to execution objects, separate stores can be used. Effectively the same scheduler might run on all virtual processors or specialized schedulers might run on different virtual processors depending on the requirements of the workload.

Figure 1E:
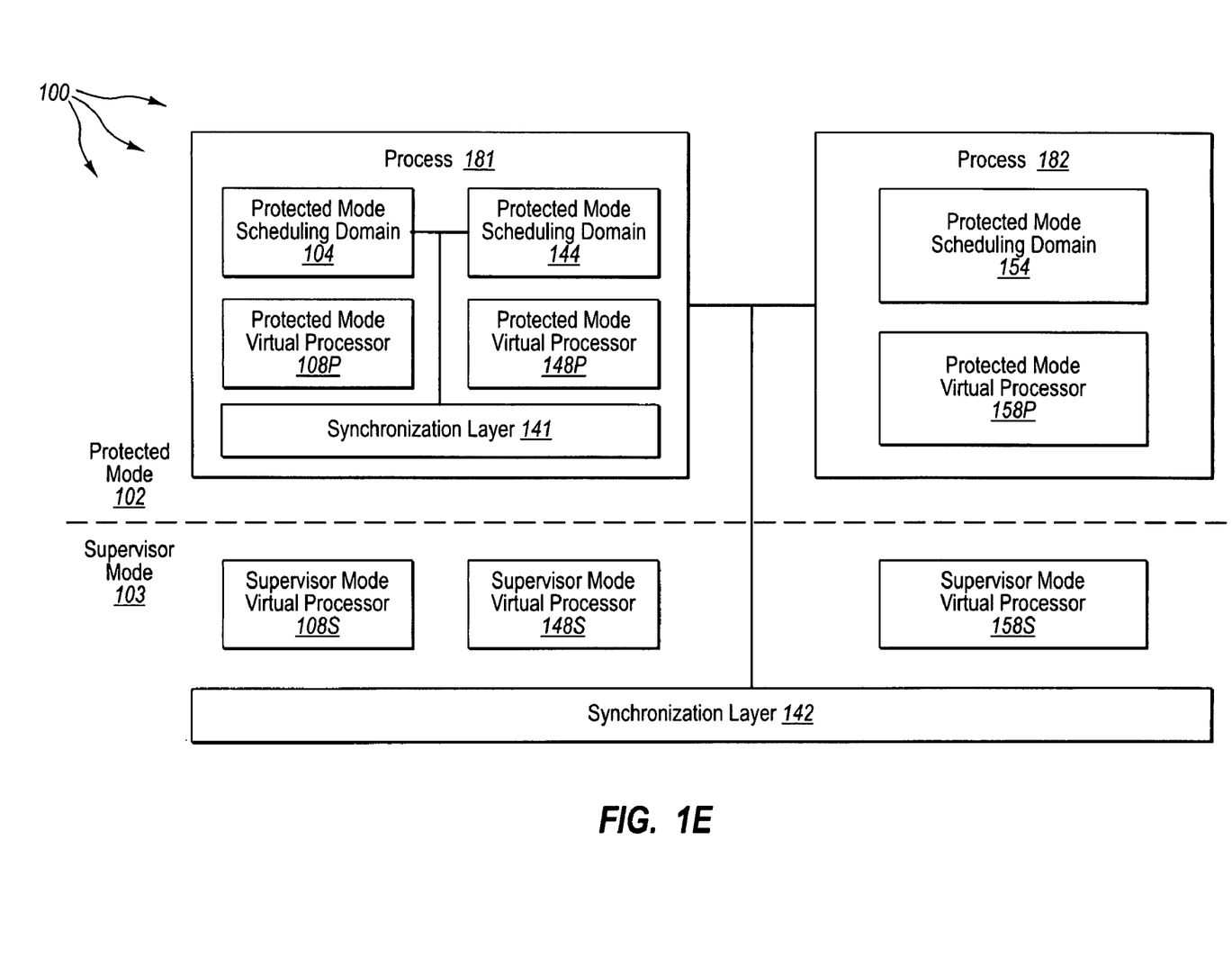
FIG. 1E illustrates a portion of the example computer architecture depicting components for synchronizing between protected mode scheduling domains.

FIG. 1E illustrates a portion of the example computer architecture 100 depicting components for synchronizing between protected mode scheduling domains. As depicted, process 181 and process 182 are running in protected mode 102. Process 181 includes protected mode scheduling domains 104 and 144, protected mode virtual processors 108P and 148P and synchronization layer 141. Process 182 includes protected mode scheduling domains 154 and protected mode virtual processors 158P. Supervisor mode virtual processors 108S, 148S, and 158S, run in supervisor mode 103 and correspond to virtual processors 108P, 148P, and 158P respectively. Supervisor mode 103 also includes synchronization layer 142.

Synchronization operations within a protected mode scheduling domain are handled by the protected mode scheduler with no involvement of supervisor mode. For example, synchronization within protected mode scheduling domain 104, 144 or 154 can be handled without reference to external synchronization layers. In some embodiments, synchronization of execution objects between protected mode schedulers is also performed with no involvement of supervisor mode. For example, synchronization between protected mode scheduling domains 104 and 144 can be handled at synchronization layer 141 within process 182.

In other embodiments synchronization of execution objects between processes is also performed. For example, synchronization between either of protected mode scheduling domains 104 and 144 and protected mode scheduling domain 154 can be handled at synchronization layer 142 within supervisor mode 103.

Channel events can be used to facilitate synchronization. A channel event is an event that two execution objects from specific protected mode scheduling domains participate in. For example, in a channel between process 181 and process 182, an execution object from protected mode scheduling domain 144 and an execution object from protected mode scheduling domain 154 can participate in a channel event that supports inter-process communication. An inter-process channel event can be implemented as synchronization layer 142 in supervisor mode 103. When a channel event is signaled, supervisor mode 103 notifies the supervisor mode virtual processor, which in turn raises a virtual interrupt to notify the protected mode virtual processor (e.g., 148 or 158) of the event.

Similarly the same operation might take place between protected mode scheduling domains within the same process. For example, protected mode scheduling domains 104 and 144 may require a synchronization operation. A channel event can be used to compensate for potentially different execution object formats used between protected mode scheduling domains 104 and 144. An intra-process channel event can be implemented as synchronization layer 141 in process 181. Synchronization layer 141 can creates a virtual interrupt in the virtual processors (e.g., 108 or 148) that is to be notified for a new event. Protected mode schedulers can apply the channel event in the context of their own synchronization model.

Figure 2A:
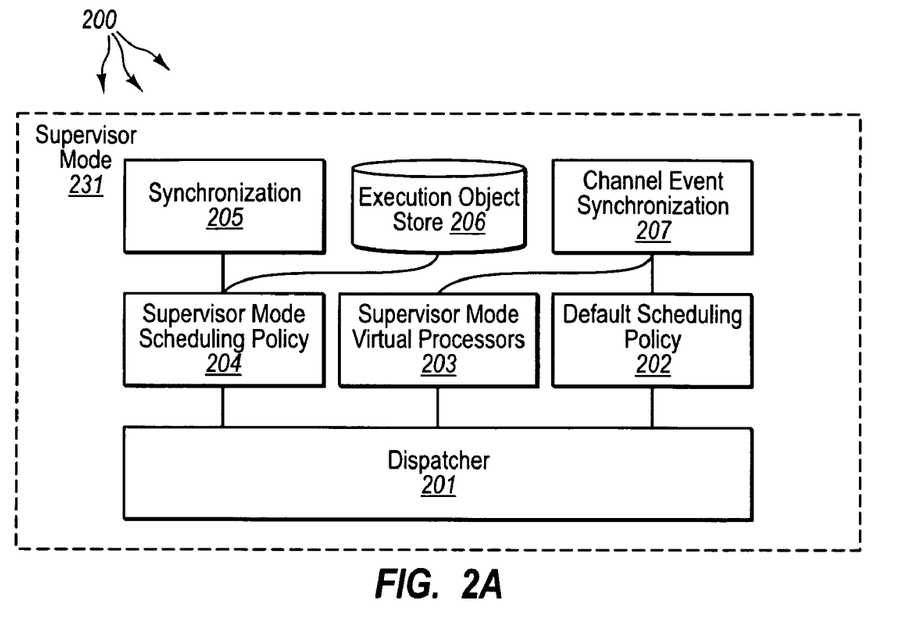
FIGS. 2A and 2B illustrate example supervisor mode infrastructures that provide features to protected mode scheduling domains.
Figure 2B:
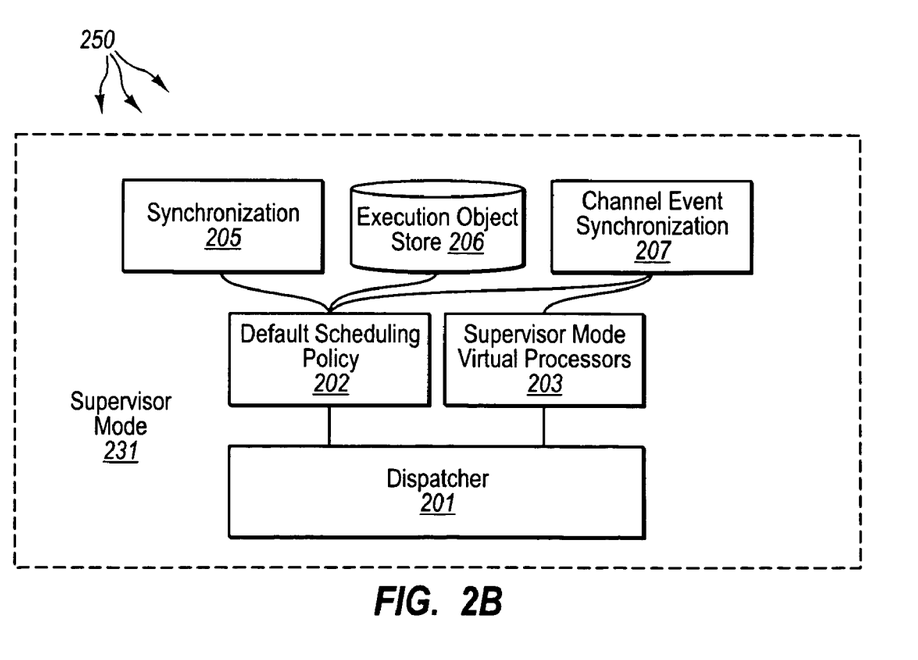

Supervisor mode scheduling infrastructure can be flexible implemented in a variety of different ways to provide appropriate features to protected mode for creating protected mode scheduling domains. FIGS. 2A and 2B illustrate example supervisor mode infrastructures 200 and 250 that provide features to protected mode scheduling domains.

As depicted, supervisor mode infrastructure 200 includes dispatcher 201, default scheduling policy 202, supervisor mode virtual processors 203, supervisor mode scheduling policy 204, synchronization 205, execution object store 206, and channel event synchronization 207. Each of the depicted components is operating in supervisor (e.g., kernel) mode 231. Supervisor mode 231 can use a default execution object (e.g., threads) to perform operations.

Supervisor mode infrastructure 200 can use a dedicated reservation to process supervisor mode execution objects (e.g., kernel threads). Supervisor mode execution object store 206 and synchronization 205 operations are associated with express supervisor mode scheduling policy 204. On the other hand, default scheduling policy 202 is used to allocate virtual processors 203 (e.g., make resource reservations) and multiplex Thus, dispatcher 201 uses default scheduling policy 202 to allocate virtual processors 203 and multiplex between them and supervisor mode scheduling policy 204 to handle communication with supervisor mode execution object store 206 and synchronization 205. Within supervisor mode infrastructure 200, supervisor mode 231 and the default scheduling policy 202 can be specifically designed for the characteristics of the respective workloads.

As depicted, supervisor mode infrastructures 250 includes dispatcher 201, default scheduling policy 202, supervisor mode virtual processors 203, synchronization 205, execution object store 206, and channel event synchronization 207. Each of the depicted components is operating in supervisor (e.g., kernel) mode 231. Supervisor mode infrastructure 250 uses default scheduling policy 202 for handling both supervisor mode execution objects and virtual processors assigned to the default reservation.

Figure 3:
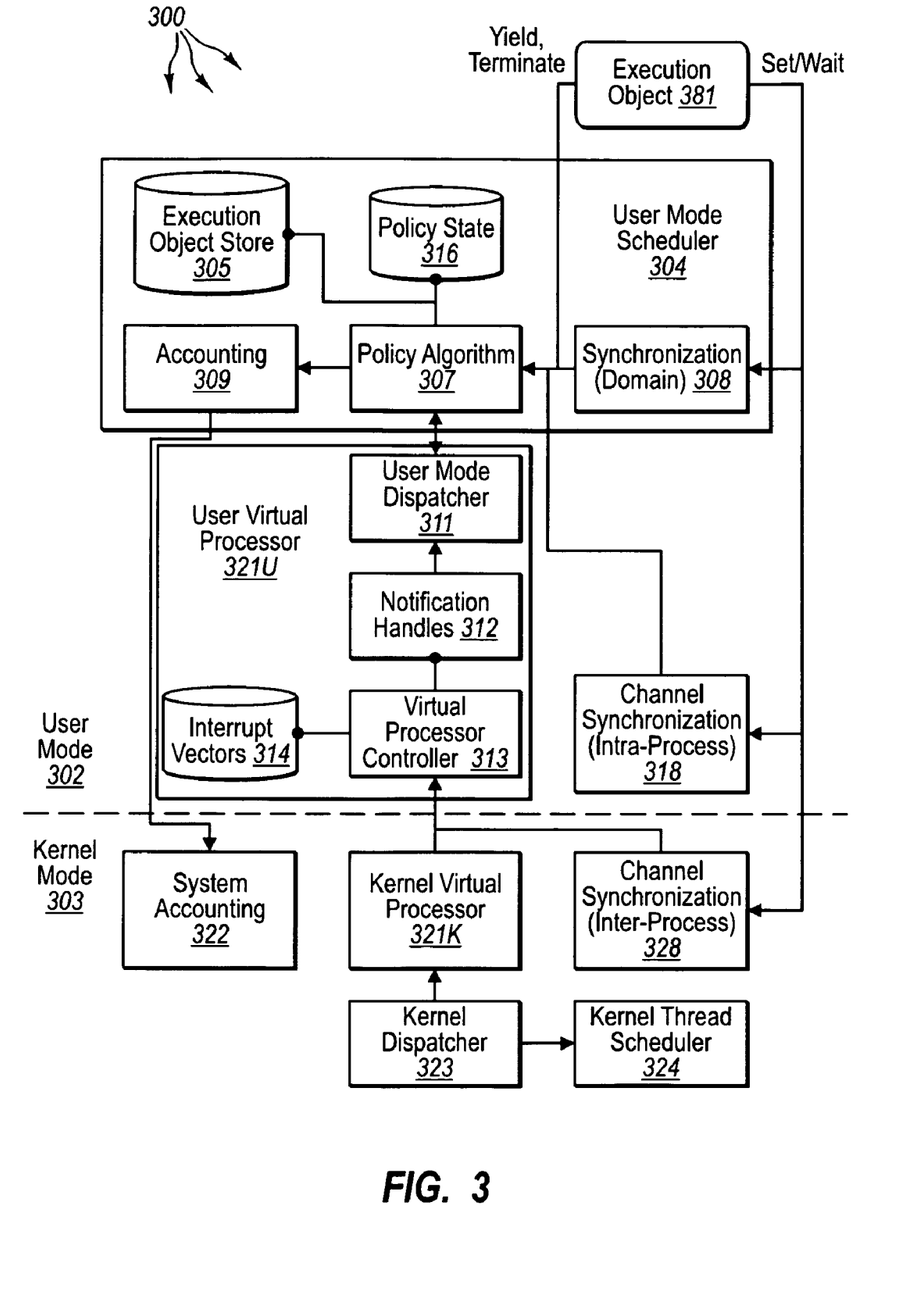
FIG. 3 illustrates an example user mode scheduling architecture.

FIG. 3 illustrates an example user mode scheduling architecture 300. User mode scheduling architecture 300 depicts an example of how various components in computer architecture 100 can be combined to provide user mode scheduling for execution objects. As depicted, user mode scheduler 304 includes execution object store 305, policy state 316, accounting 309, policy algorithm 307, and synchronization (domain) 308. User mode schedule 304 can allocate processor resources to execution object 181 or other execution objects. Synchronization (domain) 308 can coordinate state transitions between execution objects within user mode scheduler 304.

User virtual processor 321U is configured to process kernel mode notifications from kernel mode 303 and dispatch execution objects within user mode scheduler 304. User virtual processor 321U can simulate the behavior of physical processor 109. User virtual processor 321U can use either of the two notification models, interrupt and completion port paradigms, for asynchronous events. Context switching takes places in user mode dispatcher 311 without involving any calls to supervisor mode 103. Dispatcher 311 can switch content to execution objects (e.g., ToDos) on top of a runable queue.

Generally, notification handles 312 are responsible for processing notification requests generated by an operating system, such as, for examples, timers and synchronization outside of user mode scheduler 304. User mode scheduler 304 can set timers for either preemption or workload. Kernel mode 303 can raise a virtual interrupt when the timer expires. Synchronization events outside of user mode scheduler 304 can also raise virtual interrupts Non-blocking Application Binary Interface ("ABI") be issued in kernel mode 303, raising an interrupt on completion. Notification handles 312 can handle any of these types of interrupts.

Interrupt vectors 314 store memory addresses or indexes into an interrupt vector table (contain memory addresses) for notification handles 312. Thus, when a virtual interrupt is received, virtual processor controller 313 can refer to interrupt vectors 314 to execute the appropriate handler in response the virtual interrupt.

Kernel dispatcher 323 can dispatch between kernel virtual processor 321K and kernel threads in accordance with a default scheduling policy or a combination of a default scheduling policy and kernel scheduling policy 324 (e.g., as in supervisor mode architectures 200 and 250).

Channel synchronization (intra-process) 318 can synchronize between user mode scheduler 304 and other user mode schedules in the same process with user mode scheduler 304. Channel synchronization (inter-process) 328 can synchronize between user mode scheduler 304 and user mode schedules in the different processes.

Accounting 309 and system account 322 interoperate to manage accounting functions, such as, for example, physical processor resources usage.

Accordingly, protected mode (e.g., user mode) scheduling can facilitate the development of programming frameworks that better reflect the requirements of the workloads through the use of workload-specific execution abstractions. In addition, the ability to define scheduling policies tuned to the characteristics of the hardware resources available and the workload requirements has the potential of better system scaling characteristics Further, and previous described protected mode scheduling decentralizes the scheduling responsibility by moving significant portions of scheduling functionality from supervisor mode (e.g., kernel mode) to an application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a physical processor and an operating system having a protected mode and a supervisor mode, wherein protected mode limits program access to physical processor resources of programs running in protected mode, supervisor mode having unlimited access to physical processor resources, one or more functions gating access to supervisor mode to permit a program in protected mode to transition to supervisor mode to access physical processor resources, wherein programs executed within the operating system can transition from protected mode to supervisor mode and from supervisor mode to protected mode depending on program instructions, supervisor mode having a default supervisor-mode execution object format that consumes physical processor resources on a time-shared basis in accordance with a default supervisor-mode scheduling policy, a method for configuring the scheduling of processor resources to occur in protected mode to decentralize scheduling responsibility from supervisor mode, the method comprising:
   an act of creating a protected-mode scheduling domain operating in the protected mode of the operating system, creating the protected-mode scheduling domain including:
      creating a virtual processor, the virtual processor mapping at least a portion of the physical processor for use by execution objects of the protected-mode scheduling domain, the virtual processor including:
         a supervisor-mode virtual processor, the supervisor-mode virtual processor configured to reserve at least a portion of the physical processor for use by execution objects of the protected-mode scheduling domain, the reservation being performed according to the default supervisor-mode scheduling policy; and
         a protected-mode virtual processor, the protected-mode virtual processor configured to process supervisor-mode notifications and dispatch execution objects for execution on the at least a portion of the physical processor during the reservation obtained by the supervisor-mode virtual processor such that multiple execution objects are scheduled by the protected-mode virtual processor to execute during the reservation;
      loading at least one protected-mode scheduling policy that differs from the default supervisor-mode scheduling policy, the at least one protected-mode scheduling policy for scheduling the execution of the execution objects of the protected-mode scheduling domain on the virtual processor; and
      creating an execution object store configured to store state for execution objects of the protected-mode scheduling domain to facilitate switching context between different execution objects within the protected-mode scheduling domain.

2. The method as recited in claim 1, wherein protected mode comprises user mode and supervisor mode comprises kernel mode.

3. The method as recited in claim 1, wherein the act of creating a protected-mode scheduling domain comprises an act of creating a user-mode scheduling domain in user mode of the operating system.

4. The method as recited in claim 1, wherein the act of creating a virtual processor comprises an act of creating a virtual processor that maps physical process resources for use by execution objects in a user-mode scheduling domain.

5. The method as recited in claim 1, wherein the act of creating a protected-mode scheduling domain operating in the protected mode of the operating system comprises an act of creating a protected-mode scheduling domain within a process that already includes one or more other protected-mode scheduling domains.

6. The method as recited in claim 5, further comprising:
   an act of configuring channel events between the protected-mode scheduling domain and the one or more other protected-mode scheduling domains to facilitate intra-process synchronization of the protected-mode scheduling domains within the process and without having to transition to supervisor mode.

7. The method as recited in claim 5, wherein the act of loading at least one protected-mode scheduling policy that differs from the default supervisor-mode scheduling policy comprises loading at least one protected-mode scheduling policy that differs from the one or more other protected-mode scheduling domains.

8. The method as recited in claim 1, further comprising:
   an act of the supervisor-mode virtual processor reserving the at least a portion of the physical processor in accordance with a supervisor-mode default scheduling policy.

9. The method as recited in claim 1, further comprising:
   an act of using channel events between the protected-mode scheduling domain and one or more other protected-mode scheduling domains to facilitate intra-process synchronization of the protected-mode scheduling domains within a process and without having to transition to supervisor mode.

10. At a computer system, the computer system including a physical processor and an operating system having a protected mode and a supervisor mode, wherein protected mode limits program access to physical processor resources of programs running in protected mode, supervisor mode having unlimited access to physical processor resources, one or more functions gating access to supervisor mode to permit a program in protected mode to transition to supervisor mode to access physical processor resources, wherein programs executed within the operating system can transition from protected mode to supervisor mode and from supervisor mode to protected mode depending on program instructions, supervisor mode having a default supervisor-mode execution object format that consumes physical processor resources on a time-shared basis in accordance with a default supervisor-mode scheduling policy, a method for scheduling the consumption of processor resources in protected mode to decentralize scheduling responsibility from supervisor mode, the method comprising:
   an act of receiving an allocation of physical processor resources, the allocation being made according to a default supervisor-mode scheduling policy, the allocation comprising a duration of time on the physical processor resources;

an act of allocating, during the duration of time, the physical processor resources to a first execution object of a protected-mode scheduling domain within the protected-mode scheduling domain, physical processor resources allocated in accordance with a protected-mode scheduling policy that differs from the default supervisor-mode scheduling policy;

an act of executing the first execution object on the allocated physical processor resources to partially complete work indicated in the first execution object;

an act of determining, during the duration of time and in accordance with the protected-mode scheduling policy, that the second execution object is to be executed on the allocated physical resources during the duration of time within the protected-mode scheduling domain prior to fully completing the work indicated in the first execution object;

an act of switching context from the first execution object to the second execution object within protected mode and without transitioning to supervisor mode, including:
  an act of persisting the state of first execution object in an execution object store, the execution object store resident within the protected-mode scheduling domain; and
  an act of loading the state of the second execution object from the execution object store;

an act of allocating the physical processor resources to the second execution object of a protected-mode scheduling domain within the protected-mode scheduling domain subsequent to switching context to the second execution object such that the first and second execution objects execute on the allocated physical processor resources during the duration of time; and an act of utilizing the allocated physical processor resources to partially complete work indicated in the second execution object during the duration of time.

11. The method as recited in claim 10, wherein protected mode comprises user mode and supervisor mode comprises kernel mode.

12. The method as recited in claim 11, wherein kernel mode uses threads and wherein the protected-mode scheduling domain is a user-mode scheduling domain that uses an execution object format other than threads.

13. The method as recited in claim 10, wherein the act of allocating physical processor resources to a first execution object of a protected-mode scheduling domain within the protected-mode scheduling domain comprises an act of allocating physical processor resources to an execution object in user mode of the operating system.

14. The method as recited in claim 10, wherein allocating physical processor resources to a first execution object comprises allocating physical processor resources reserved by a kernel-mode virtual processor.

15. A computer system, the computer system comprising:
one or more physical processors;
system memory;
one or more physical storage media having stored thereon computer executable instructions representing an operating system having a user mode and a kernel mode that, when executed at one of the processors, cause the computer system to perform the following:
  create a user-mode scheduling domain operating in user mode so as to decentralize scheduling from kernel mode, creating the user-mode scheduling domain including:
    creating a virtual processor, the virtual processor mapping at least a portion of the one or more physical processors for use by user-mode execution objects in the user-mode scheduling domain, the virtual processor including:
      a kernel-mode virtual processor, the kernel-mode virtual processor configured to reserve at least a portion of the one or more physical processors for use by the user-mode execution objects, the reservation being performed according to the default supervisor-mode scheduling policy; and
      a user-mode virtual processor, the user-mode virtual processor configured to process kernel-mode notifications and dispatch execution objects for execution on the at least a portion of the physical processor during the reservation obtained by the kernel-mode virtual processor such that multiple execution objects are scheduled by the user-mode virtual processor to execute during the reservation;
    loading a user-mode scheduling policy for scheduling the execution of the execution objects within the user-mode scheduling domain on the virtual processor; and
    creating a user-mode execution object store configured to store state for user-mode execution objects to facilitate switching context between different user-mode execution objects within the user-mode scheduling domain and without transitioning to kernel mode such that the kernel mode is relieved from having to store context information for user-mode execution objects; and subsequent to creation of the user-mode scheduling domain:
  receive an allocation of physical processor resources, the allocation being made according to a default kernel-mode scheduling policy, the allocation comprising a duration of time on the physical processor resources;
  allocate the physical processor resources reserved by the kernel-mode virtual processor to a first user-mode execution object during the duration of time, the physical processor resources allocated in accordance with the user-mode scheduling policy;
  utilize the allocated physical processor resources to partially complete work indicated in the first execution object;
  determining, during the duration of time, and in accordance with the user-mode scheduling policy, that allocation of physical processor resources reserved by the kernel-mode virtual processor is to transition to a second user-mode execution object prior to fully completing the work indicated in the first user-mode execution object;
  switch context from the first user-mode execution object to the second user-mode execution object within user mode and without transitioning to kernel mode, including:
    an act of persisting the state of first user-mode execution object in the user-mode execution object store; and
    an act of loading the state of the second execution object from the user-mode execution object store;
  allocate physical processor resources to the second user-mode execution object within the user-mode scheduling domain subsequent to switching context to the second execution object such that the first and second execution objects execute on the allocated physical processor resources during the duration of time; and
  utilize the allocated physical processor resources to partially complete work indicated in the second user-mode execution object.

16. The system as recited in claim 15, wherein the user-mode scheduling algorithm is the same as a kernel-mode scheduling algorithm and user-mode execution objects are threads.

17. The system as recited in claim 15, wherein the user-mode scheduling algorithm differs from a kernel-mode scheduling algorithm.

18. The system as recited in claim 15, further comprising:
computer executable instructions that, when executed, cause the computer system to configure channel events between the user-mode scheduling domain and one or more other user-mode scheduling domains within the same process as the user-mode scheduling domain to facilitate intra-process synchronization of user-mode scheduling domains within the process and without having to transition to kernel mode; and computer executable instructions that, when executed, cause the computer system to configure channel events between the user-mode scheduling domain and one or more other user-mode scheduling domains in other processes to facilitate inter-process synchronization of user-mode scheduling domains.

\* \* \* \* \*